Nov. 18, 1952  W. B. RETZ  2,618,044
MACHINE TOOL
Filed April 4, 1947  3 Sheets-Sheet 1

WILLIAM B. RETZ INVENTOR.

BY
Mitchell Berkhut
ATTORNEYS.

WILLIAM B. RETZ INVENTOR.

BY Mitchell Bechert
ATTORNEYS.

Nov. 18, 1952     W. B. RETZ     2,618,044
MACHINE TOOL

Filed April 4, 1947     3 Sheets-Sheet 3

WILLIAM B. RETZ INVENTOR.

BY
Mitchell Bekert
ATTORNEYS.

Patented Nov. 18, 1952

2,618,044

UNITED STATES PATENT OFFICE 2,618,044

MACHINE TOOL

William B. Retz, Plainville, Conn., assignor to The New Britain Machine Company, New Britain, Conn., a corporation of Connecticut Application April 4, 1947, Serial No. 739,453

2 Claims. (Cl. 29—37)

My invention relates to multiple-operation machines, such as automatic multiple-spindle machines.

It is known that, no matter how accurately the bearings for the spindles in a multiple-spindle machine may have been located, there remain certain inaccuracies which cause side- or end-working tools to produce slightly different depths of cut on work supported in successive spindles. Various proposals have been made for presenting calibrated abutments to the tool slides or to their feeding mechanisms so as to reduce this source of error, but because of a ratchet or other loose-driving connection, there is always the probability of these calibrated stops getting out of step with the spindle positions for which they are calibrated.

It is, accordingly, an object of my invention to provide an improved automatic means for variously determining limiting feed positions of a tool on a multiple-spindle machine.

It is another object to provide an improved synchronizing mechanism whereby, once calibrated, the feed-position-limiting means for a particular tool will always remain in step with motion of the spindle carrier.

It is a more specific object to provide a means for operating a plurality of indexible calibrated abutments directly from the spindle carrier.

It is an over-all general object to provide an improved mechanism whereby maintenance, checking, and setting-up time for a multiple-spindle machine may be reduced.

Other objects and various further features of the invention will be pointed out or will occur to those skilled in the art from a reading of the following specification in conjunction with the accompanying drawings. In said drawings.

Briefly stated, my invention contemplates a direct driving connection between a spindle carrier and a plurality of feed-position-limiting abutments or other devices associated with a tool slide or with various tool-slides on the machine, whereby synchronized spindle-carrier and abutment indexing may be assured. In the specific form to be described, feed positions for a tool slide are determined by a number of calibrated abutments corresponding to the number of spindles with which the tool is to cooperate, and there is a 1:1 direct drive connection between calibrated abutment devices and the spindle carrier.

Figures 1, 2:
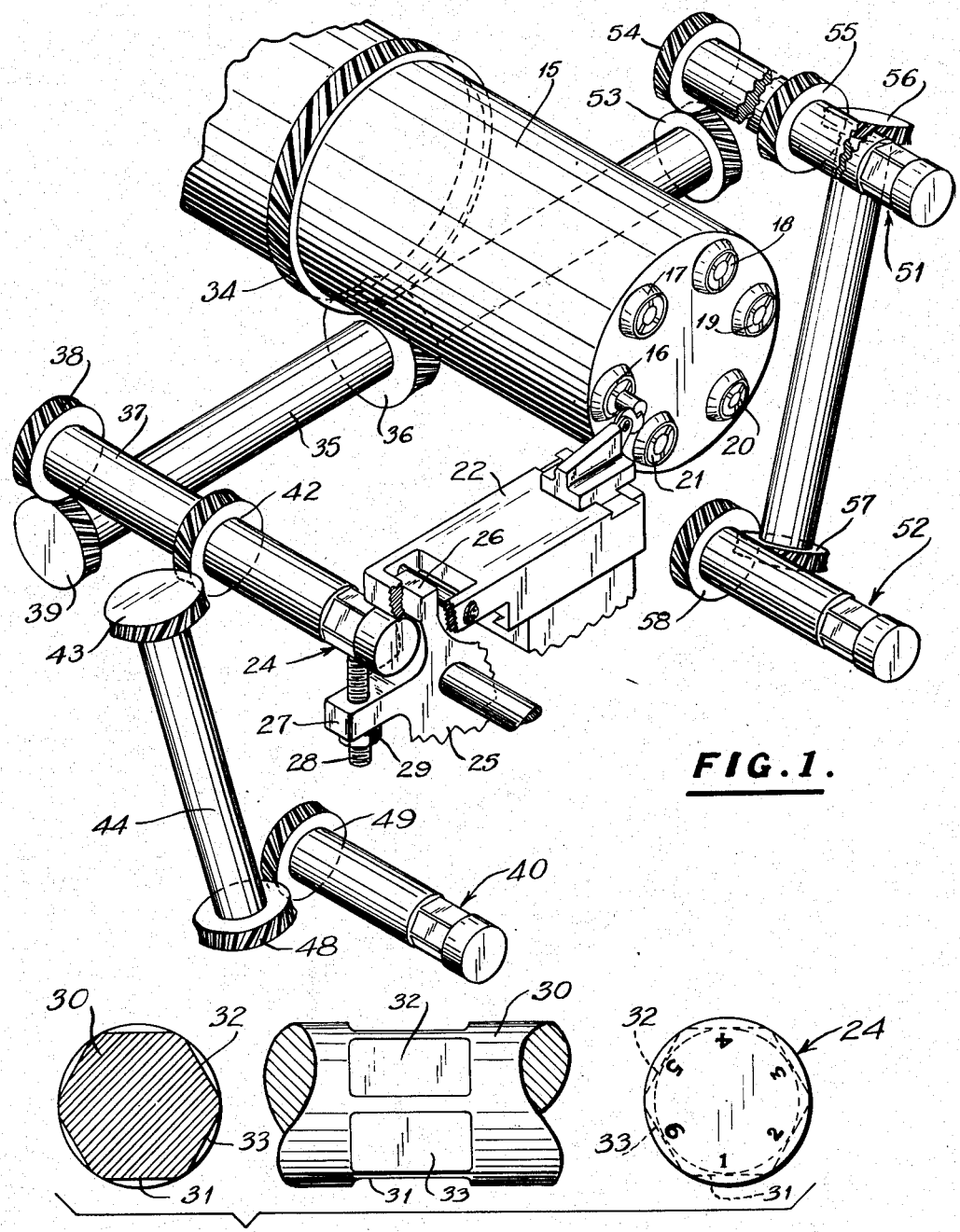
Fig. 1 is a generally schematic isometric view of certain elements of a multiple-spindle machine incorporating features of the invention.
Fig. 2 is a collection of enlarged views of an element of Fig. 1 showing, right-to-left, an end view, a central broken-away side view, and a central sectional view.

Referring to the drawings, my invention is shown in application to a multiple-spindle machine having a drum-type spindle carrier 15 supporting a plurality of spindles 16—17—18—19—20—21. Tools are supported on a plurality of tool slides 22—23 so that a plurality of tools may simultaneously cooperate with work held in a plurality of spindles 16—21. For the sake of clarity, only one tool-slide mechanism, namely the tool slide 22, has been shown in Fig. 1, but it will be understood that a similar mechanism may support a tool for cooperation with the spindle 17 and that other mechanisms may be provided for cooperating, say, with the spindles 19—20.

In accordance with a feature of the invention, a suitably calibrated abutment member, such as the abutment member 24 for the tool slide 22, may cooperate either with the tool slide itself or with the feed mechanism therefor to determine a limiting feed position of the tool slide 22, depending upon the spindle 16 with which the tool slide 22 may be cooperating. In the form shown, the tool slide 22 is fed by a rocker-arm mechanism 25 having an arm 26 feedingly to engage the tool slide 22, and an arm 27 to abut the abutment member 24. Adjustment of the latter abutment may be made by a screw member 28 threaded to the arm 27 and locked in its adjusted position as by a nut 29.

In the form shown, the calibrated abutment member is formed of generally cylindrical stock 30 and a plurality of abutment surfaces, such as the flats 31, 32, 33, are milled, honed, or otherwise formed in the periphery of the cylindrical member 30. It will be understood that, as the actuator 25 is fed (clockwise, in the sense of Fig. 1), the tool slide 22 will bring its tool into engagement with the work in spindle 16, and that the limiting feed position of the cut made thereby will be determined when the abutment screw 28 homes on that flat (of the abutment member 24) which has been calibrated for the spindle position 16. In the form shown, each flat (31—32—33, etc.) on the member 24 is individually calibrated for properly positioning tool slide 22 with respect to whichever spindle 16 . . . 21 it may be co-operating.

In accordance with a feature of the invention, I provide a direct drive from the spindle carrier 15 to the calibrated abutments, such as the abutment member 24, so that, once adjusted and calibrated, the various flats on the member 24 will be presented in correct and synchronized sequence for proper cooperation of tool slide 22 with the spindles 17, 18, 19, 20, and 21, as they follow spindle 16. Since the abutment flats on member 24 correspond in number to the number of spindles 16 through 21, the drive connection preferably provides a 1:1 speed ratio. In the form shown, this drive is accomplished by providing an annular spiral gear 34 on the spindle carrier 15, and by driving a transversely extending shaft 35 from the annular gear 34 through a meshing spiral gear 36. The abutment member 24 may be formed as part of a rearwardly extending shaft 37 which, through another train of spiral gears 38—39, is directly driven from the transversely extending shaft 35. Each of the gear trains 34—36 and 38—39 may provide a 1:1 ratio or they may be otherwise proportioned, but, as indicated, the preferred arrangement is such as to produce a 1:1 drive from the spindle carrier 15 to the abutment member 24.

Figure 3:
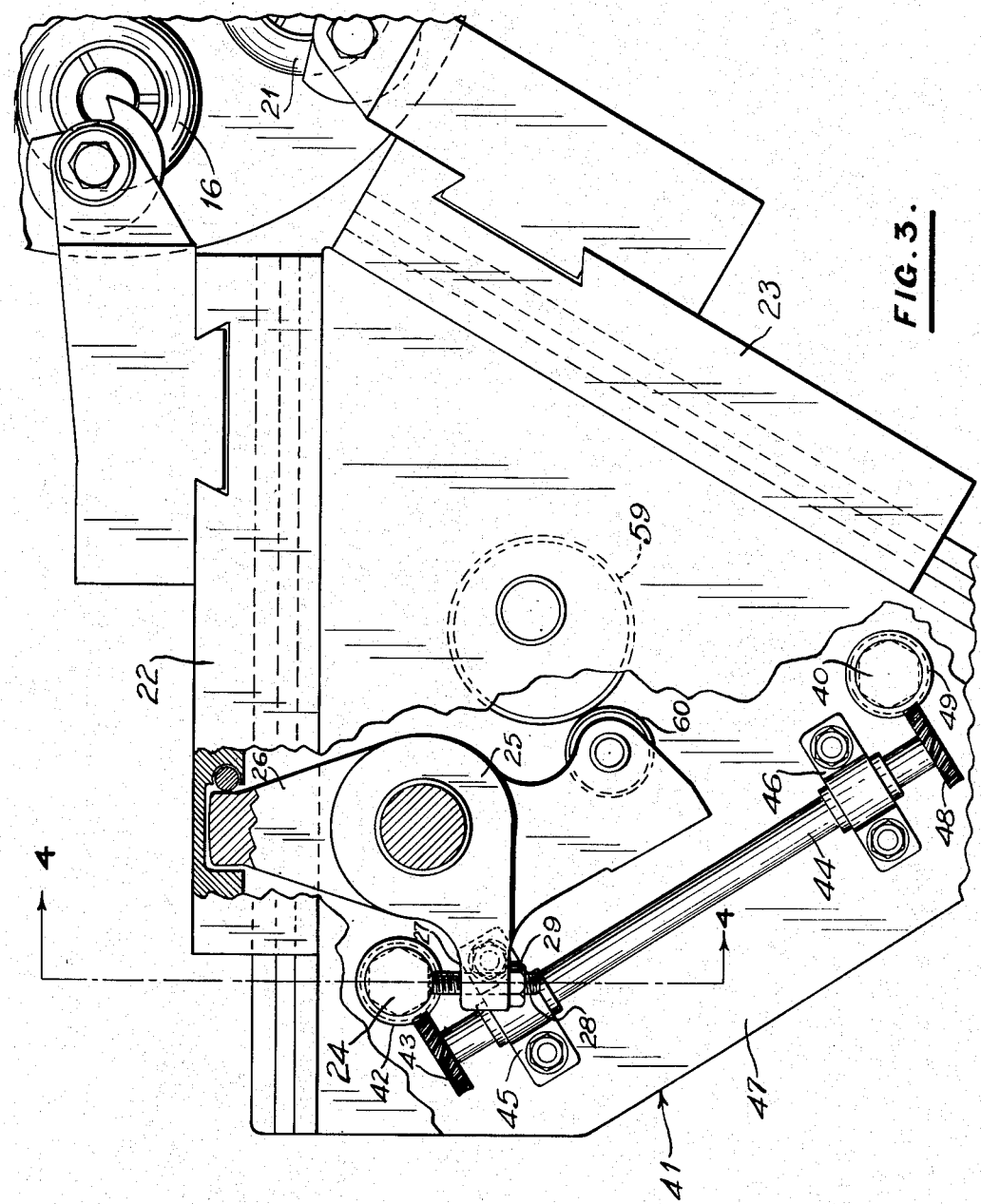
Fig. 3 is an enlarged elevational view of a cross-slide mechanism for the machine of Fig. 1, with parts broken away to illustrate features of the invention.
Figure 4:
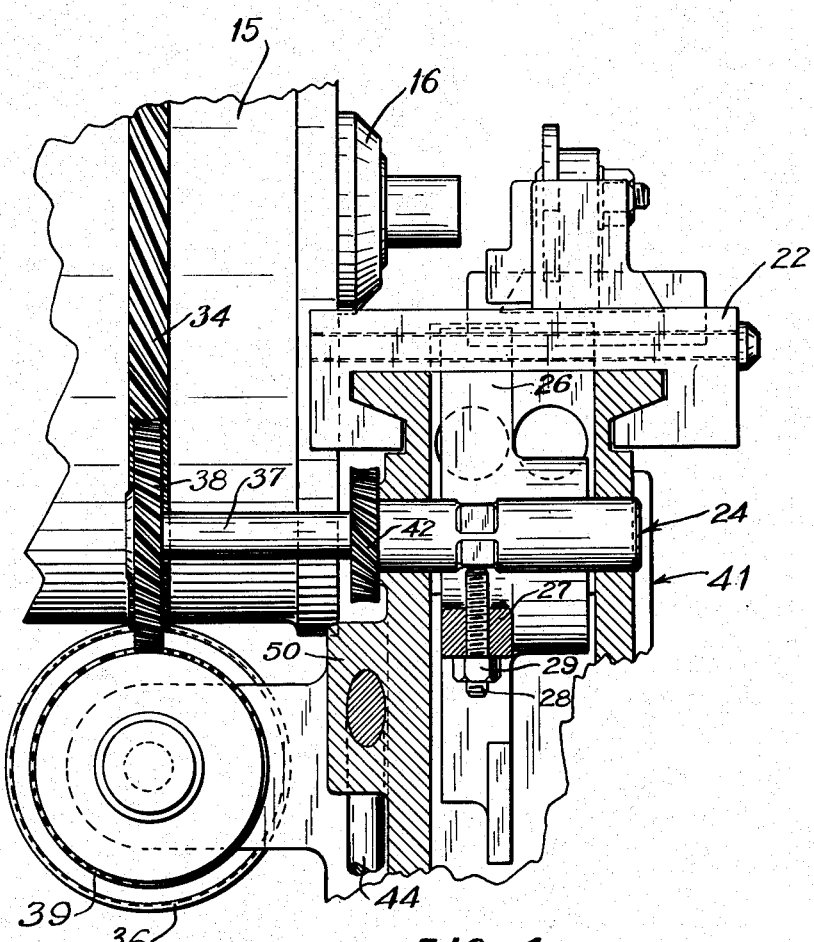
Fig. 4 is a sectional view taken substantially in a plane such as 4—4 of Fig. 3, but on a slightly modified cross-slide arrangement.

As indicated generally above, there is preferably a calibrated abutment member, such as the member 24, for each tool slide. In the form shown, an abutment member 40 is carried in the same cross-slide mechanism 41 as the abutment member 24 and the abutment member 40 will be understood to serve the cross-slide 23 in a manner analogous to that described for the cooperation between abutment member 24 and cross-slide 22. Since abutment members 24 and 40 are in the same cross-slide unit 41, the drive for member 40 may be simplified somewhat by directly coupling the two abutment members 24—40 within or close to the housing for the cross-slide mechansm 41. In the form shown, a 1:1 spiral gear train 42—43 provides synchronizing drive to a cross-shaft 44 supported by brackets 45—46 (Fig. 3) secured, say, to the base plate 47 of the housing 41. Rotation of the shaft 44 is then directly applied to the abutment member 40 through another 1:1 spiral gear train 48—49. In the form shown in Fig. 4, the cross-shaft 44 is supported or journalled in suitable journalling lugs 50 formed on the back of the housing for the cross-slide mechanism 41.

In a manner similar to that which has been described for the cross-slide mechanism 41 on the front side of the machine, it will be understood that correspondingly synchronized feeds may be provided for a cross-slide mechanism (not shown) on the back side of the machine. For example, an abutment member 51 may properly determine limiting feeds for the tool to cooperate with spindle 19, while an abutment member 52 similarly controls the feed into work supported by the spindle 20. Drives for both these abutment members 51—52 may in all respects be similar to those which have been described. In other words, a first train of spiral gears 53—54 may directly translate the rotation of transverse shaft 35 into rotation of the abutment member 51, and two further sets of spiral gears (namely trains 55—56 and 57—58) may serve simultaneously to rotate the abutment member 52. It will thus be clear that for each indexing of the spindle carrier 15 all the abutment members 24—40—51—52 may be indexed a corresponding amount, so that each may present a new and properly calibrated abutment surface for the determination of appropriate limiting feed positions for the various tools depending upon the spindles with which they may be cooperating.

It may be helpful to describe a typical sequence of operations, with particular reference to the operation of the tool-slide 22. Tool-slide 22 is actuated in a feeding direction by the actuating arm 26 of the rocker mechanism 25, and the latter in turn is driven from a feed cam 59 through a suitable cam-follower roll 60. The feed cam 59 may be continuously rotated, and in the form shown it should complete six revolutions for each revolution of the spindle carrier. In other words, there will be a complete feed cycle for the tool-slide 22 for each indexed spindle position. In the case of tool-slide 22 cooperating with the spindle 16, the cutting stroke will be halted, or rather its limiting feed position determined, by an abutment of the screw 28 against, say, the calibrated surface 31—which means that spindle 16 corresponds to the flat 31 on the outer exposed face of the abutment member 24. The surface 31 will be understood to have been previously calibrated as by honing to provide just the correct stop for working spindle 16 with tool-slide 22.

Upon retraction of the actuator arm 26, as by a draw-back cam (not shown), the spindle carrier will be indexed one position so as to place the spindle 17 in position for cooperation with the tool-slide 22. Simultaneous with this indexing of the spindle carrier, the abutment member 24 (and all other abutment members 40—51—52) will have been indexed, so that the surface 33 is now positioned for abutment with the abutment screw 28. When the cross-slide 22 is now fed by cam 59 into its most forward position, the calibrated surface 33 will determine a limiting feed position for tool slide 22 particularly appropriate for the spindle position 17. It will be understood that by the time all six abutment surfaces on the abutment member 24 have each cooperated once with the actuating mechanism for the cross-slide 22, the spindle carrier 15 will have been fully rotated, and the original spindle 16 will again be in position to be worked by cross-slide 22; at this time, the abutment surface 31 will again be in position to provide correct feed relations.

It will be understood that abutment members (such as member 24) may take any of a number of shapes and forms. The described arrangement is, however, preferred, in that substantial bearing support may be provided by the housing for the cross-slide mechanism 41 on both sides of the abutment surfaces.

It will be appreciated that I have described a relatively simple mechanism for assuring complete synchronization of a variety of tool operations, all of which may be performed simultaneously on work supported in a number of spindles on a multiple spindle machine. According to the novel arrangement, once initial set-up operations and calibrations have been effected, there is no danger of adjustments getting out of step. It will further be appreciated that my synchronizing mechanism is independent of the ordinary working adjustments that it may be necessary on the tool elements on various tool slides. For example, once all abutment members 24—40, 51—52 have been properly calibrated, the machine may be set up for performing widely different functions. That is, tools may be replaced, and tool holders may be replaced, without in any way affecting the basic synchronized corrective functions of the directly driven abutment members.

Although the invention has been described with particular reference to a machine in which adjacent spindles are indexed into cooperating relation with respect to any particular tool, it will be clear that the indexing of successive spindles and abutment surfaces may be equally applicable to machines in which successive spindles for any one tool are not necessarily adjacent spindles. For example, every odd spindle may be indexed to cooperate with one tool, and every even spindle may be indexed to cooperate with another (and adjacent) tool.

While I have described my invention in detail for the preferred forms shown, it will be understood that various changes and modifications may be made within the scope of the invention as defined in the claims which follow.

I claim:

1. In a machine of the character indicated, an indexible spindle carrier, two separate cross-slides for independent movement relatively to said spindle carrier, and separate feed-limiting means for said cross-slides, each said feed-limiting means including a rotatable member with a plurality of flats corresponding to the number of indexible positions of said spindle carrier, and a drive connection between each said rotatable member and said spindle carrier.

2. In a machine of the character indicated, a spindle carrier for supporting a plurality of spindles, a plurality of tool slides positioned to cooperate with a plurality of spindles on the spindle carrier, means for relatively indexing said spindle carrier and said tool slides to bring successive spindles into separate positions relatively to tools carried by said tool slide, separate feed-position limiting means for each of said tool slides for determining limiting feed positions for the tools, each said feed-position limiting means comprising rotatable means with separate limiting surfaces corresponding to each of the spindles with which the tools may cooperate, and driving means connecting said spindle carrier to all said feed-positioning limiting means for positioning the limiting surfaces of all said feed-position limiting means n accordance with the indexed position of said spindle carrier.

WILLIAM B. RETZ.

REFERENCES CITED

The following references are of record in the file of this patent:

UNITED STATES PATENTS

| Number | Name | Date |
|---|---|---|
| 1,081,932 | Smith | Dec. 16, 1913 |
| 1,224,955 | Oliver et al. | May 8, 1917 |
| 1,320,609 | Drissner et al. | Nov. 4, 1919 |
| 1,716,303 | Cone | June 4, 1929 |
| 2,142,557 | Cone | Jan. 3, 1939 |
| 2,187,683 | Drissner | Jan. 16, 1940 |
| 2,325,571 | Montgomery | July 27, 1943 |